Nov. 2, 1943.    C. HEDDON    2,333,174
WEED GUARDED FISH LURE
Original Filed May 13, 1941
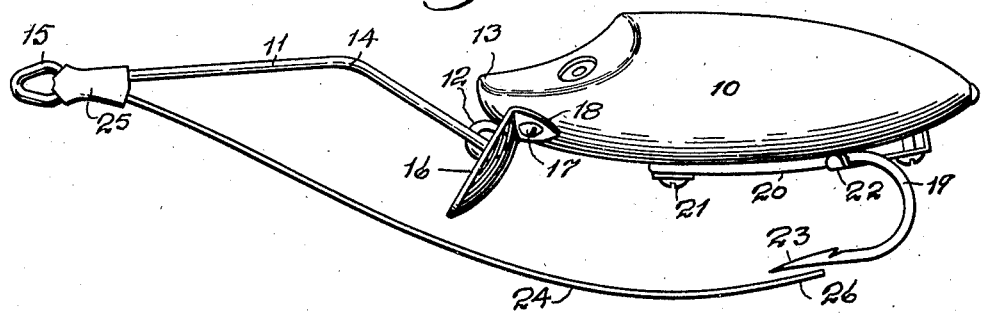
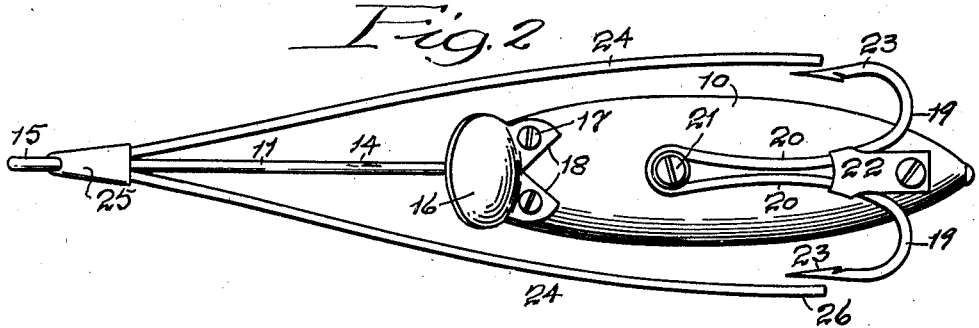
Inventor:
Charles Heddon,
John Heddon,
EXECUTOR OF ESTATE OF
Charles Heddon, DECEASED,
By Banning & Banning
Attorneys.

Patented Nov. 2, 1943

2,333,174

UNITED STATES PATENT OFFICE 2,333,174

WEED GUARDED FISH LURE

Charles Heddon, deceased, late of Dowagiac, Mich., by John Heddon, executor, St. Joseph, Mich., assignor to James Heddon's Sons, Dowagiac, Mich., a corporation of Michigan Original application May 13, 1941, Serial No. 393,205. Divided and this application April 15, 1942, Serial No. 439,045

4 Claims. (Cl. 43—39)

In the manufacture of fish baits of many different types, it has long been the practice to provide means for weed guarding the hooks by the employment of resilient spring prongs or the like, which protect the barbed tips of the hooks and are adapted to yield under the impact of a fish's strike.

It is now proposed to guard the forward end of the bait body by the provision of a leader of the specific type shown in the McArthur patent, No. 2,270,070, dated January 13, 1942, but in the case of the usual plug baits, the means provided for guarding the bait as a whole is inadequate, in that certain portions of the entire bait afford outstanding obstructions which are likely to become befouled by weeds or the like, so that it becomes impossible to use a plug bait body in heavily weeded waters which game fish are most often accustomed to inhabit, so that it becomes essential to make provision for weed guarding the entire bait and not merely certain portions thereof.

The object of the present invention, therefore, is to provide a lure which in its entirety will afford deflecting means for spreading or opening up an unobstructed path through a weed bed so that no portion of the entire lure will afford points of lodgment for the weeds, and this without impairing the effectiveness of the lure in hooking fish which strike the bait body.

In designing the lure of the present invention account is also taken of the fact that, whether the fish strikes from the side or from behind, three triangularly spaced points of resistance for the fish's jaws will be afforded by the bait body in conjunction with the laterally and downwardly projecting hook points, so that in closing its jaws upon the bait body the weed guarding elements will yield to permit the hook points to be driven into the flesh, thereby hooking the fish on the strike itself rather than by a jerk on the line imparted through the rod.

As to the form of the bait body and the arrangement of the hooks, it is preferred to employ the body and hook arrangement shown and described in a co-pending application of the late Charles Heddon, Serial No. 359,711, filed October 4, 1940, with a leader of the character employed in the McArthur patent application aforesaid, but in neither of the devices shown in these respective applications is provision made for the weed guarding of the lure as a whole, so that it becomes essential to employ the respective devices in combination in order to fully attain the weed guarding effect provided for by the lure of the present invention. The features that are special to this invention are disclosed in the pending application of the late Charles Heddon, filed May 13, 1941, Serial No. 393,205, of which this application is a division.

It will be understood that it is not the intention, however, to limit the present invention to the combined use of the specific features above mentioned, since the principles embodied in the present invention may find exemplification in the specifically different forms of construction.

Further objects and details will appear from the description of the invention in conjunction with the accompanying drawing, wherein—

Figure 1 is a side elevation of a fish lure embodying the features of the present invention; and Fig. 2 is a view showing the under side of the lure.

The lure comprises a plug bait body 10 of the conventional ovate formation, which trails behind a leader 11 which is flexibly linked at its rear end to an eye 12 extending from a point beneath the nose 13 of the bait body. The leader 11, in the form shown, is bent upwardly near its rear end to afford an elbow or hump 14 which, when the lure is being trailed through the water, will ordinarily stand in sufficiently elevated relation to the nose or tip of the body 10 to deflect weeds or other obstructions upwardly and over the smooth sloping surface of the body, so that the same will not be caught and lodged in the space between the leader and the nose or tip of the body.

While for purposes of illustration the leader is shown as being formed of a section of wire angularly bent to afford the hump in question, it will be understood that an equivalent configuration, affording a hump of similar character and disposed in such a way as to subserve the deflecting function, may be employed in lieu of the bent wire herein illustrated.

The leader at its forward end terminates in an elongated eye 15 which affords a line tie and is preferably tapered toward its forward end to reduce to a minimum the possibility of lodgment of fine weeds or grass at the tip end of the leader.

The body is provided at its forward end with a lip or chin piece 16 of conventional character, which extends downwardly and forwardly from the tip of the body and is secured thereto by screws 17 entered through prongs 18. The body in the preferred form shown is provided with twin hooks 19, the shanks 20 of which extend in closely adjacent parallel relation beneath the body and may be rigidly secured thereto in any desired manner, but as shown are secured at their forward ends by a screw 21 or similar attachment, and at their rear ends by a clip 22 or the like, so that the rigidly fastened hook points extend downwardly and outwardly from the body, which together with the diverging hooks provide three points of resistance to the strike of the fish's jaws.

By attaching the hooks rigidly to the under side of the body in the manner indicated, the recurved barbed hook points 23 will diverge laterally and downwardly from the body so that the hook points will present themselves in unyielding relation to the bait body at all times, and a fish's jaws, striking into the bait body, will necessarily force one or both of the hook points into the flesh by the heavy impact of the strike and without further effort on the part of the fisherman to set the hooks. With the hook points thus immovably fixed, they are adequately guarded by suitable means designed to afford protection to the bait as a whole, including the leader.

The under side of the bait as a whole is guarded by resilient prongs 24 which converge toward their forward ends and are secured to the forward end of the leader by means of a clip or winding 25, or by soldering to afford a rigid connection at this point. The prongs diverge from front to rear, and their tip ends 26 normally lie in close proximity to the hook points 23. The prongs are bowed downwardly to afford a clearance for the chin piece 16, which permits the bait body to swivel upon the free connection at the rear end of the leader, so that the normal darting, swinging and diving movements of the bait body are unimpeded by the presence of the weed guarding prongs. The prongs are preferably made of light resilient wire so that they will yield under the impact of a fish's strike to expose the hooks to the jaws of the fish.

Various modifications in the shape and arrangement of the weed guarding members may be made without departing from the spirit of the invention, which resides in the employment of weed guarding means of adequate character which diverge from a point in advance of the body of the lure and provide for the protection throughout the entire lure of all protruding portions thereof which might otherwise afford obstructions for the accumulation of weeds or the like, and at the same time afford the necessary resiliency to yield under the strike of a fish.

It is desirable to connect the forward convergent ends of the guard wires to the leader at a point well in advance of the chin piece 16, since experiments have shown that where weed guarding wires are mounted too close to the chin piece or similar element which develops a swimming action, the guard wires will more or less seriously interfere with the action of the bait by disturbing the water immediately in front thereof.

The structure as a whole is one which provides complete protection against befouling at all points, without, however, interfering in any way with the normal intended movement of the bait and without interfering with the effectiveness of the bait in hooking the fish on a strike.

The following is claimed:

1. In a fish lure, the combination of a plug body provided near its forward end with a depending chin piece, a leader extending forwardly from the body and freely linked thereto at its rear end, a hook rigidly secured to the plug body and having its recurved barbed point projecting away form the body, and weed guarding prongs secured to the leader and extending rearwardly and divergently to a position normally adjacent the hook point and adapted to deflect weeds away from the body and from the hook.

2. In a fish lure, the combination of a plug body provided near its forward end with a depending chin piece, a leader extending forwardly from the body and freely linked thereto at its rear end, a hook rigidly secured to the plug body and having its recurved barbed point projecting away from the body, and weed guarding prongs secured to the leader near its forward end and extending rearwardly and divergently to a position normally adjacent the hook point and adapted to deflect weeds away from the body and from the hook.

3. In a fish lure, the combination of a plug body provided near its forward end with a depending chin piece, a leader extending forwardly from the body and freely linked thereto at its rear end, companion hooks having their forward ends rigidly secured to the under side of the body and having their recurved barbed pointed ends spaced from one another and extending oppositely outwardly from the body, and resilient weed guarding prongs having their forward ends converging and secured to the leader and extending divergently therefrom beneath the chin piece and the plug body and having their rear ends lying normally adjacent the hook points and adapted to deflect weeds away from the body and from the hooks.

4. In a fish lure, the combination of a plug body provided near its forward end with a depending chin piece, a leader extending forwardly from the body and freely linked thereto at its rear end, companion hooks having their forward ends rigidly secured to the under side of the body and having their recurved barbed pointed ends spaced from one another and extending oppositely outwardly from the body, and resilient weed guarding prongs having their forward ends converging and secured to the forward portion of the leader and extending divergently therefrom beneath the chin piece and the plug body and having their rear ends lying normally adjacent the hook points and adapted to deflect weeds away from the body and from the hooks.

JOHN HEDDON,
*Executor of the Estate of Charles Heddon, Deceased.*